INVENTORS
Leonard V. Hosford
David Davison
BY
ATTORNEY

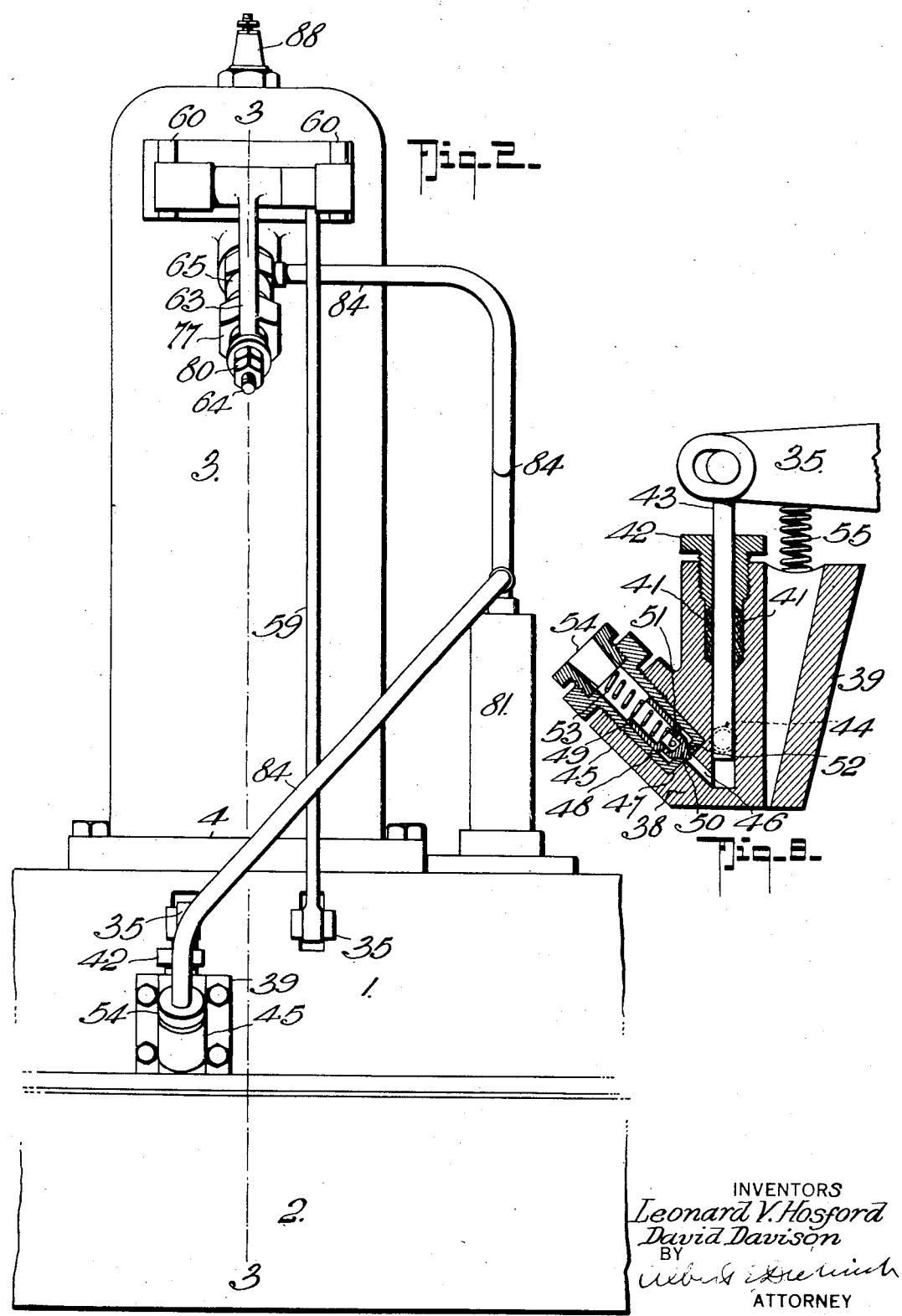

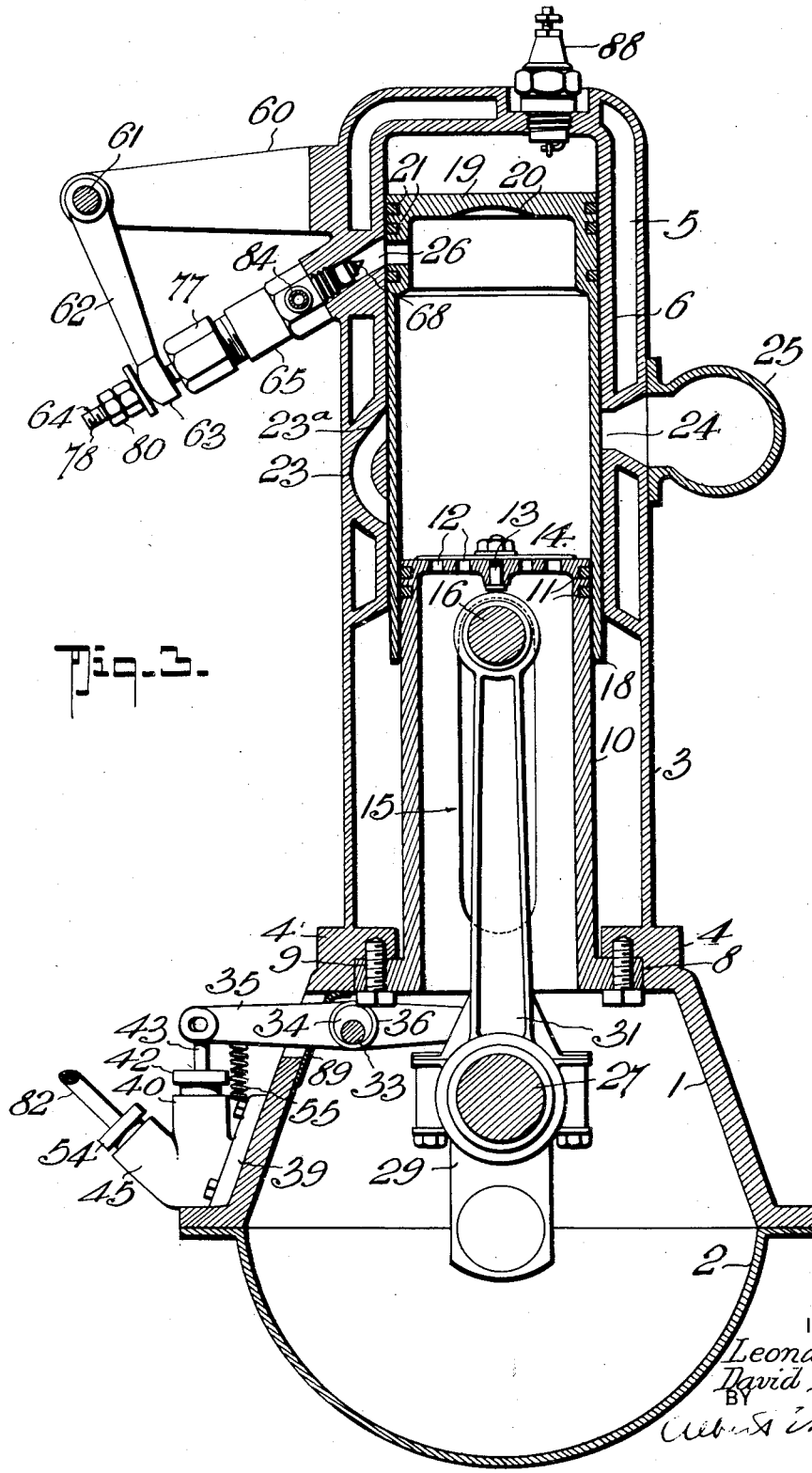

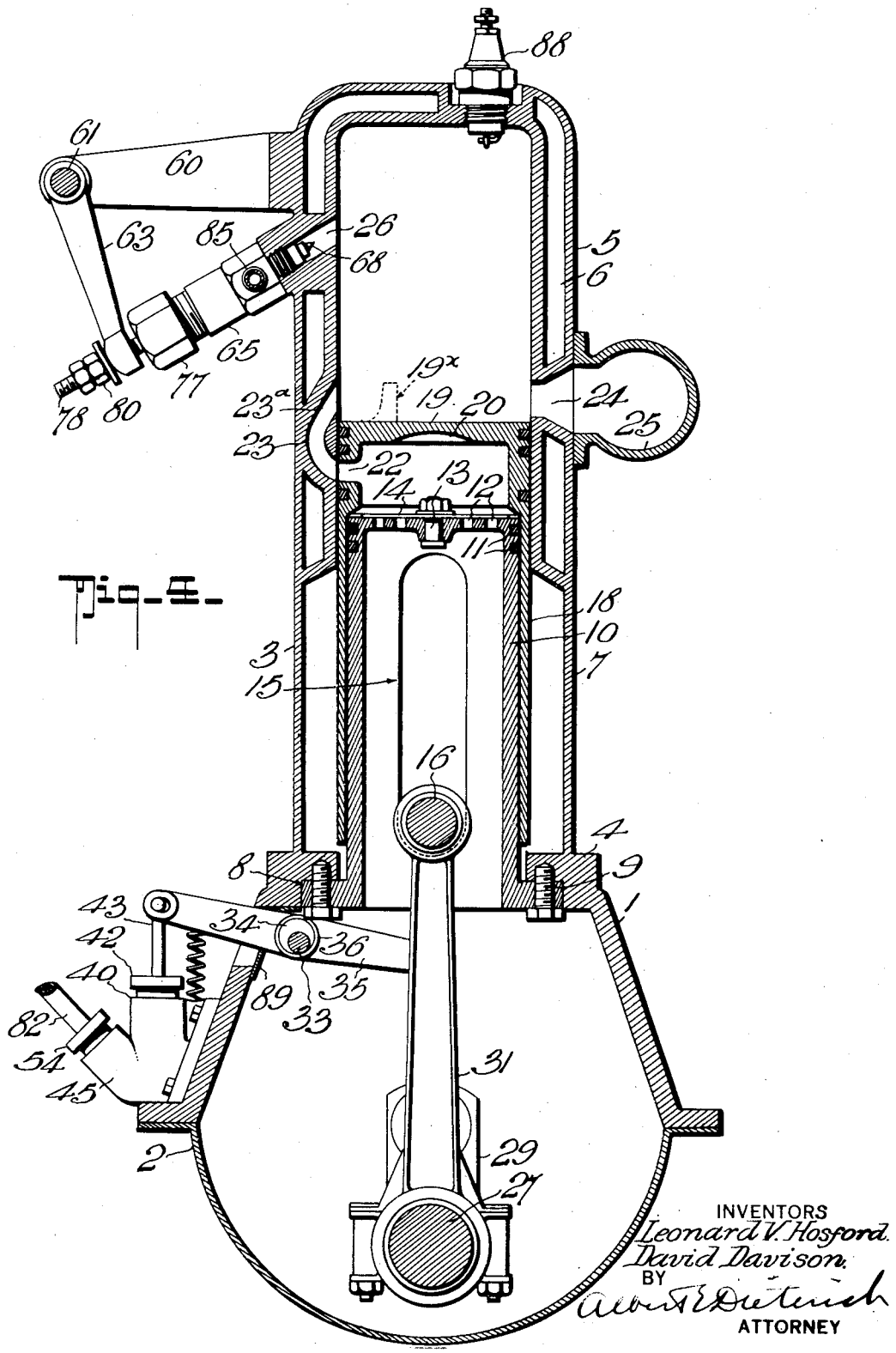

Aug. 20, 1929.  L. V. HOSFORD ET AL  1,725,274
TWO-CYCLE INTERNAL COMBUSTION ENGINE AND METHOD OF OPERATING THE SAME
Filed Aug. 23, 1924  6 Sheets-Sheet 5
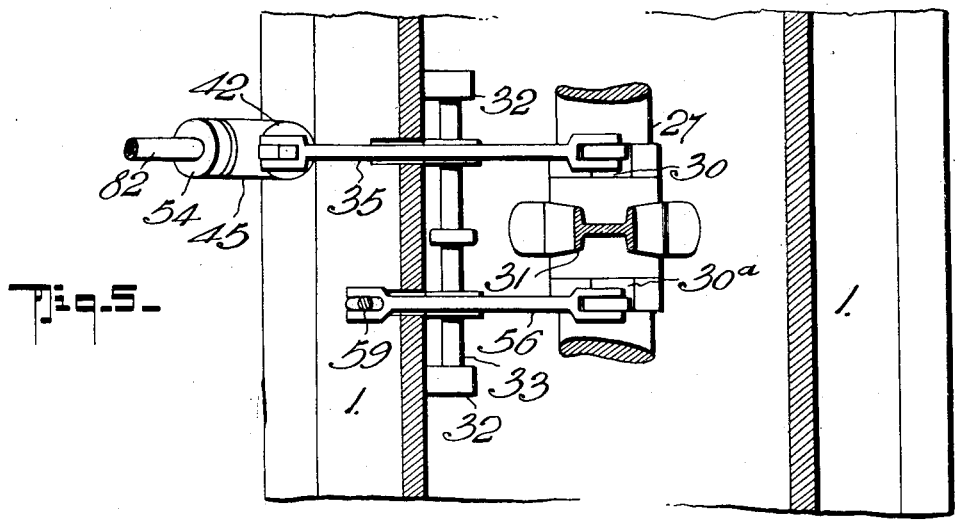
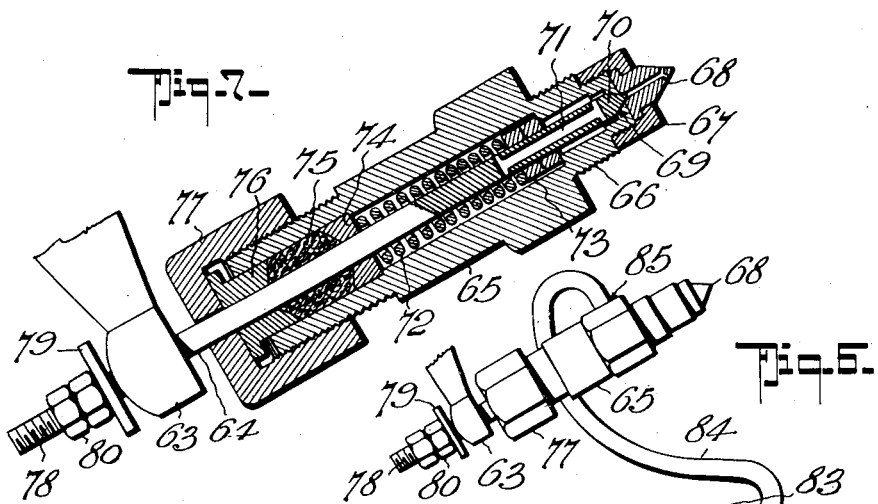
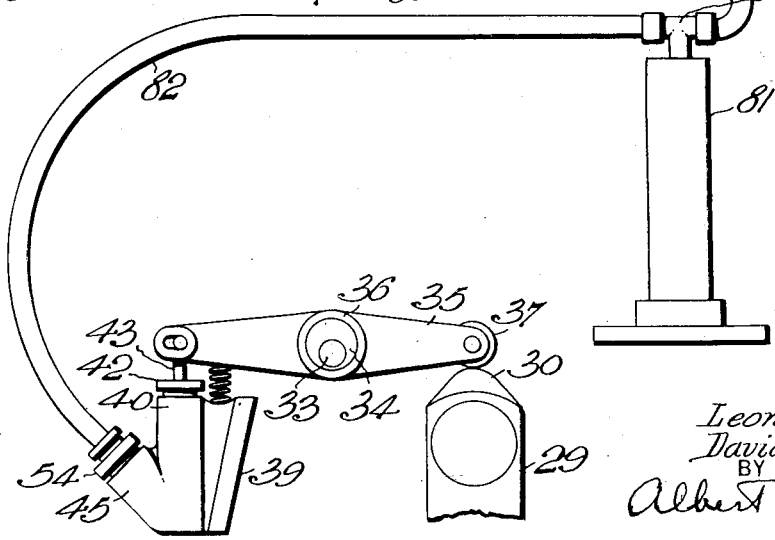
INVENTORS.
Leonard V. Hosford
David Davison
BY
Albert F. Dietrich
ATTORNEY

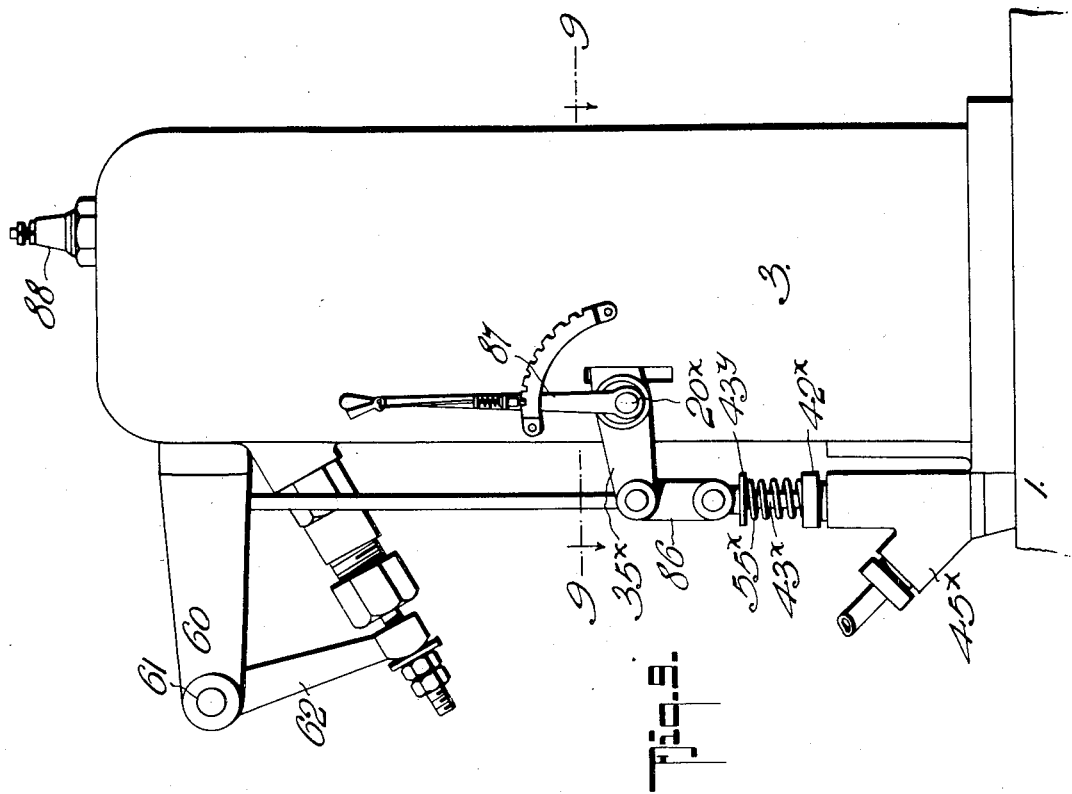
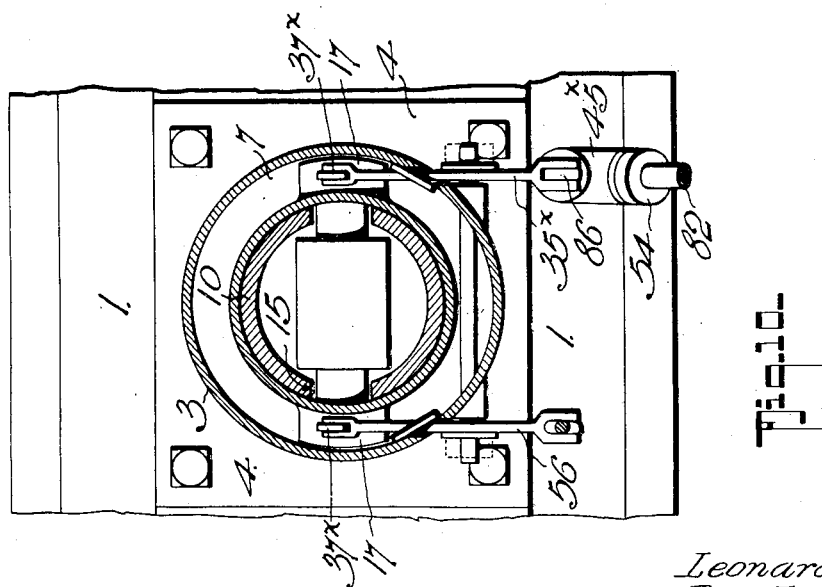

Patented Aug. 20, 1929.

1,725,274

UNITED STATES PATENT OFFICE.

LEONARD V. HOSFORD AND DAVID DAVISON, OF PORTLAND, OREGON, ASSIGNORS, BY MESNE ASSIGNMENTS, TO HOSFORD MOTOR CONSTRUCTION CO., A CORPORATION OF OREGON.

TWO-CYCLE INTERNAL-COMBUSTION ENGINE AND METHOD OF OPERATING THE SAME.

Application filed August 23, 1924. Serial No. 733,814.

Our present invention, which relates generally to the art of internal combustion engines, has particular reference to such engines as are especially designed and adapted for the burning of low grade fuel. In devising our engine, it has been our object to provide one operative on the two cycle principle and so designed and constructed as to be comparatively inexpensive to build, rugged in its structure and capable of use on heavy duty trucks as well as on light passenger vehicles and aerial navigating machines; a further object of the invention is to provide an engine of this character with a fuel injection valve, an oil pump and the operating parts therefor so arranged and designed with respect one to the other and to the engine proper as to provide the greatest efficiency of operation with minimum fuel consumption; another object is to provide an engine of such cylinder and piston design as will enable effective lubrication of the moving parts, cooling of the cylinder and piston walls, etc., and in which friction resistance and weight of parts is reduced to a low degree.

Again, our invention has for an object to provide an engine of such construction that a charge of cooling air is drawn into the piston at each stroke, which air is then used as the supporter of combustion for injecting the fuel charge into it before it is compressed and by-passed into the working chamber of the engine, there expanded to displace the burnt charge and then recompressed and ignited to do its work on the piston through the working stroke of the same.

In our present invention, we also have provided means for governing the operation (power and speed) of the engine by varying the pressure of the fuel injected and also by varying its period of admission, in a simple way, either by hand control or through the medium of a suitable governor mechanism.

With other objects in view which will appear later, the invention resides in those novel structures, combinations and arrangements of parts, all of which will be first described and then be specifically pointed out in the appended claims, reference being had to the accompanying drawings, in which:

Figure 2 is an elevation taken from a position at right angles to that shown in Figure 1.

Figure 3 is a central vertical longitudinal section on the line 3—3 of Figure 2.

Figure 4 is a view similar to Figure 3 with the piston at the lower or inner position.

Figure 5 is a detail horizontal section on the line 5—5 of Figure 1.

Figure 6 is a diagrammatic view of the fuel charging mechanism.

Figure 7 is an enlarged detail section of the fuel injector.

Figure 8 is an enlarged detail section of the pump.

Figure 9 is an elevation of a modification of the invention.

Figure 10 is a horizontal section on the line 9—9 of Figure 9.

Figure 1:
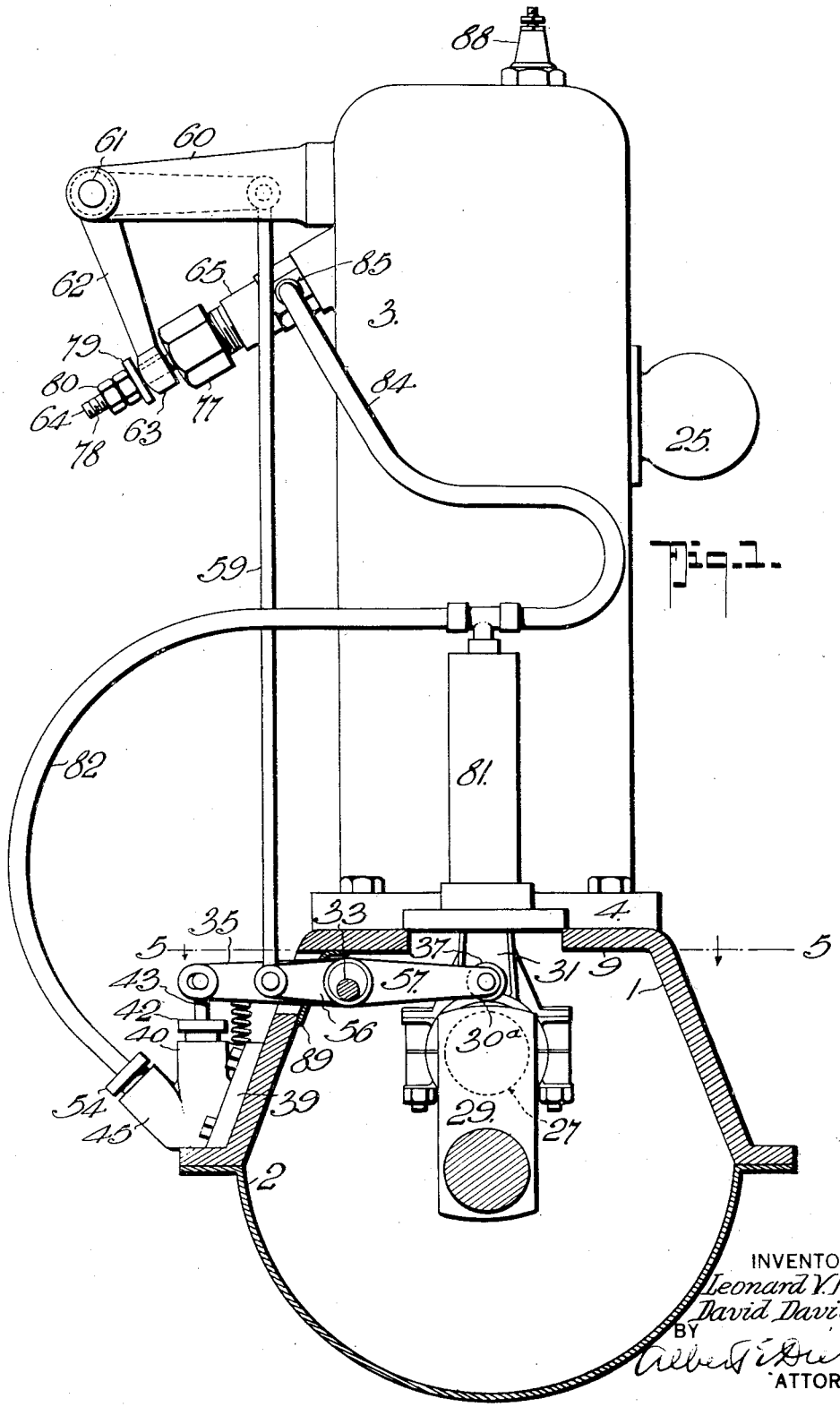
Figure 1 is an elevation and part section of the invention.

Referring now in detail to the accompanying drawings, in which like numerals and letters of reference indicate like parts in all of the figures, 1 represents the base of the crank case and 2 the removable bottom thereof.

3 is the main or outer cylinder which is secured to the crank case base 1 by means of a base 4 set on the crank case base and fastened thereto by cap screws or other suitable means. The cylinder 3 is water-jacketed at 5 and it has an inner wall 6 which houses the working chamber.

The cylinder 3 is provided with a recess or air chamber 7 below the water jacketed portion of which more will be said later.

The flange 4 of the cylinder 3 is recessed at 8 to receive the flange 9 of the inner or stationary piston 10, which parts are secured together by cap screws or in any other suitable way.

The inner or stationary piston 10 is provided with suitable packing rings 11 and its head has air passages 12 and a stud 13, the latter adapted to retain the non-return disk valve 14 which lies over the air passages or apertures 12.

The inner or stationary piston 10 has slotways 15 for the passage of the wrist or gudgeon pin 16.

The movable piston 18, which fits the inner diameter of the wall 6 and the outer diameter of the piston 10 has a head 19, the under side of which is preferably concaved at 20 and it is provided with packing rings 21 on its outer periphery to prevent the escape of gases from the combustion chamber past the piston.

The piston 18 has a port 22 in its side wall near the head to cooperate with the by-pass 23, the outlet portion 23ª of which is directed upwardly at an acute angle toward the head of the cylinder. This, we believe, will make the use of the usual piston head baffle (see dotted lines 19ˣ) unnecessary, although, if desired, the baffle 19ˣ may be employed.

24 is the exhaust port for the burnt gases and it is preferably located opposite the place where the by-pass outlet 23ª communicates with the interior of the working chamber. The exhaust port 24 is opened and closed by the movements of the piston 18 and delivers its charge into the exhaust duct (or manifold) 25.

26 is the fuel admission duct through which the charge of oil is injected into the interior of the piston 18 when the port 22 lines up with the duct 26.

The crank shaft 27 is provided with suitable bearings and has webs 29 with cam points 30—30ª (in one embodiment of the invention) as best shown in Figures 1 and 5 of the drawings. The crank shaft is joined with the piston by means of the usual connecting rod 31 that couples the crank shaft 27 with the wrist pin 16 held in the bosses 17 on the movable piston 18.

32 designates rocker arm shaft-bearings and 33 designates the rocker arm cam shaft which has cam bearings 34 for the fuel pump operating rocker arm 35 and the fuel injector operating rocker arm 56.

The rocker arm 35 has a bearing 36 to receive one of the cam bearings 34 and it also has a cam engaging roller 37 to cooperate with the cam points 30 on the web 29.

38 designates the fuel pump which comprises a supporting base 39 carrying a cylinder 40 with gland packing 41 and packing nut 42 surrounding the piston 43. 44 designates the fuel inlet port from the source of fuel supply and 45 represents the outlet neck through which the charge of fuel is pumped to the equalizer hereinafter referred to, via the duct 46 and piping connecting it with the equalizer.

47 is the fuel pump outlet check valve chamber in which the valve cage 48 is located, the said cage containing the valve plunger 49, the tip 50 of which is adapted to seat at 52 in the valve seat of the valve cage 48 that aligns with the duct or port 46. The valve plunger and tip have ports 51 to permit the passage of the oil through the valve plunger when the valve is unseated. 53 is the compression valve-seating spring, 54 the coupling nut and 55 the rocker arm lift spring for the lever 35.

The rocker arm 56 that operates the fuel injector is provided with a bearing 57 and a cam roller 58, the latter cooperating with the cam point 30ª on the webs 29ª.

59 is a pull rod which connects the rocker arm 56 with the bell crank lever 62 mounted at 61 on the bell crank support 60 that is fastened to the engine cylinder in any suitable way. One arm of the bell crank 62 is bifurcated as at 63 to straddle the needle valve 64 of the fuel injector.

The fuel injector, the construction of which is best shown in Figures 6 and 7, consists of a housing 65 having a threaded boss 66 that is adapted to screw into the fuel admission duct 26. It also has a threaded extension 66 onto which the union 67 is threaded to hold the nozzle tip 68 in place. The extension 66 is provided with a needle valve seat 69 for the valve end 70 of the needle valve 64. The needle valve 64 has suitable oil passageways 71 and it is held normally to its seat by means of a spring 72 which engages a collar 73 on the valve 64, the spring being held in place by the gland washer 74. 75 is the gland packing, 76 the gland and 77 the gland nut.

The outer end of the valve 64 is threaded as at 78 to receive the bell crank thrust washer 79 and the lock nuts 80. 81 designates the accumulator into which the oil is pumped via a pipe line 82 through a T union 83. The accumulator 81 is simply a chamber into which the fuel is pumped under pressure and from which it flows through the same T union 83 through a pipe line or duct 84 to the entrance 85 of the fuel injector. The provision of the accumulator 81 enables the pressure to accumulate or to be stored up so as to assure equal pressure at all times on the fuel valve.

In Figures 9 and 10 we have illustrated a modification of the invention by reference to which it will be seen that the rocker arm 35ˣ is mounted on the engine cylinder above the crank case on a cam shaft 20ˣ and is connected by a link connection 86 with the fuel pump piston 43ˣ, the return spring 55ˣ being mounted on the piston rod between the gland nut 42ˣ and a stop 43ʸ on the rod and 43ˣ. Also, the roller 37ˣ is designed to be engaged by one of the wrist pin bosses 17 on the up or outer stroke of the piston to effect the necessary operation of the fuel pump.

In a similar manner, and on the other side of the cylinder, the rocker arm 56 that operates the fuel injector is mounted to be operated by the opposite wrist pin boss 17.

87 is a lever by which the shaft 20 (or the shaft 20ˣ) may be turned to change the position of the eccentrics or cams, thereby varying the stroke and timing of the levers 35 and 56 (or 35ˣ and 56ˣ, as the case may be) for purposes presently more fully explained.

*Operation.*

Assume the piston 18 to be located at the downward (inward) limit of its stroke (Figure 4); as the piston is moved upwardly it closes ports 23ª—24 and also draws a charge of fresh air from the crank casing via valved ports 12, into the space within the piston. The purpose of drawing in free air in this manner throughout the entire upstroke of the piston is to produce a cooling effect on the reciprocating parts and eliminate any detrimental heat effect on these parts; this air also serves later as the supporter of combustion for the fuel oil.

As the piston 18 rises, its port 22 will come into register with the duct 26 whereupon the fuel injector valve 70 being unseated, a charge of fuel is forced into the chamber of the piston and impinges upon the heated or hot under surface 20 of the piston head thus completely vaporizing the fuel. As the piston descends, the air and fuel vapors are compressed and mixed and when the port 22 comes into alignment with the entrance of the by-pass 23, the compressed mixture is shot into the working chamber toward the head thereof, displacing any previously burnt mixture residue that may be in the working chamber through exhaust port 24.

On the next up stroke (compression stroke) of the piston, the new charge within the working chamber is compressed and, at the proper time, is ignited by the spark at plug 88 to impel the piston on its next down stroke (working stroke).

As the crank shaft turns, the cam points 30—30ª will operate their respective rocker arms to work the fuel pump and fuel injector. For changing the position of the shaft 33, the eccentrics of the rocker arm bearings are correspondingly changed thereby to cause an earlier or later action or an action of greater or less degree, as may be desired, and in this way the power and speed of the engine may be regulated; moving the shaft 33 and at the same time changing the spark timing, the engine may also be reversed, if desired.

By attaching a suitable governor mechanism (not shown) to the shaft 33 to shift the same, with varying loads on the engine, a substantially constant speed can be attained.

It is to be noted that the chamber 7 is in communication with the crank case via opening 15 so that it too may be kept filled with oil vapors generated in the crank case in the usual manner and thereby effectively lubricate the moving surfaces.

From the foregoing, it will be seen that by the use of our invention, working fuel is injected into the supporter of combustion while it is in the interior of the piston and the working charge is compressed within the piston, then permitted to expand into the working chamber and recompressed therein; a thorough mixing of the fuel charge with the air is accomplished so that greater efficiency, on ignition of the charge, is possible than where the fuel is admitted directly into the working chamber there to unite with a previously introduced scavenging charge of air.

It should be understood, of course, that the crank case is provided with any suitable breather opening which may be the openings through which the levers 35 and 56 pass and if desired these openings may be shielded against oil egress by any suitable means as, for instance, oil shields 89 carried by the levers 35 and 56 respectively, and lapping over the slots of the crank case base through which the levers project.

By providing the accumulator 81 the impulses of the pump will not seriously affect the injection of the fuel through the nozzle since the pressure is kept up by the fuel under pressure within the accumulator 81 and thus when the oil fuel valve opens the injection will be at a steady rate.

In this application we make no claim, per se, to the specific charge forming devices illustrated in Figures 6 and 7 as they constitute the subject matter of divisional applications.

From the foregoing description, taken in connection with the accompanying drawings, it is thought the complete construction, operation and advantages of our invention will be readily apparent to those skilled in the art.

What we claim is:

1. The method of operating two cycle internal combustion engines having a cylinder and a piston; said method consisting in admitting a charge of fresh air into the piston on its up stroke, injecting a charge of fuel into the air within the piston during a portion of the stroke of said piston, compressing the mixture within the piston during its down stroke, conducting the compressed mixture from within the piston into the working chamber of the engine to displace a previously burned charge to atmosphere, permitting the mixture to expand in the working chamber, recompressing the mixture in the working chamber and then igniting it to cause it to do work on the piston.

2. The method of operating two cycle combustion engines having a cylinder and a piston, which consists in causing the piston to fill itself with a charge of fresh air during a full stroke, injecting fuel oil into the air by the time the piston has completed said stroke, compressing the mixture within the piston during its next stroke, passing the compressed mixture from within the piston into the working chamber of the engine and there permitting it to expand, recompressing the expanded mixture in the working chamber, and then igniting the recompressed mixture substantially as and for the purposes described.

3. In a two cycle internal combustion engine wherein is provided a crank case, a working cylinder, a piston reciprocating in said cylinder, said cylinder having a piston controlled exhaust port, a piston controlled by-pass and a working chamber and a stationary cylinder located within the piston; means to admit air into the piston during its up stroke, means to inject a charge of fuel into the air within the piston to be mixed therewith and compressed by the piston on its down stroke before the by-pass is opened.

4. In a two cycle internal combustion engine wherein is provided a crank case, a working cylinder, a piston reciprocating in said cylinder, said cylinder having a piston controlled exhaust port, a piston controlled by-pass and a working chamber and a stationary cylinder located within the piston; means to admit air into the piston during its up stroke, means to inject a charge of fuel into the air within the piston to be mixed therewith and compressed by the piston on its down stroke before the by-pass is opened, said fuel injecting means including a fuel nozzle, a duct in the engine cylinder communicating with the working chamber thereof, a feed mechanism for supplying the fuel under pressure to the nozzle, said piston having a port, and means to open such fuel nozzle to inject the fuel when said piston port registers with said duct in the cylinder.

5. In two cycle internal combustion engines having a crank case and a crank shaft, a working cylinder with exhaust port, a piston and a connecting rod between the piston and the crank shaft; means for admitting a fresh air charge into the piston, means to inject a fuel charge into the air within the piston in the direction of the piston head, said piston adapted to compress the mixture within the piston during the working stroke of the piston, said cylinder and piston having provisions for passing the compressed mixtures from within the piston into the working chamber after the exhaust port of the engine is opened there to expand and expel a previously burned charge and be again compressed by the piston within the working chamber during the compression stroke of the piston, and means to ignite the mixture in the working chamber at the proper time.

6. In a two cycle internal combustion engine, a crank case, a working cylinder having a base flange secured to said case and being provided with an annular recess, a fixed cylinder located within and spaced from the walls of said working cylinder and having a flange fitted into said recess and secured to said working cylinder thereby to retain said cylinders in rigid fixed co-axial position, a reciprocating piston into which said fixed cylinder fits and which itself fits within the working portion of said working cylinder, said piston havng outside packing rings, said fixed cylinder having outside packing rings, said working cylinder having a cooling jacket surrounding the working chamber and an air space below the cooling jacket surrounding the outside cylinder, said fixed cylinder being in open communication at its lower end with the crank case, means for admitting air into said piston, said working cylinder having a by-pass and an exhaust port controlled by said piston, said fixed cylinder having openings in communication with said air space, a wrist pin passing through said openings and into said piston, a crank shaft and a connecting rod between said crank shaft and said wrist pin, means to fire the charge in the working chamber, said by-pass having its outlet end directed upwardly at an acute angle toward the head of the working cylinder.

7. In a two cycle internal combustion engine, a crank case, a working cylinder having a base flange secured to said case and being provided with an annular recess, a fixed cylinder located within and spaced from the walls of said working cylinder and having a flange fitted into said recess and secured to said working cylinder thereby to retain said cylinders in rigid fixed co-axial position, a reciprocating piston into which said fixed cylinder fits and which itself fits within the working portion of said working cylinder, said piston having outside packing rings, said fixed cylinder having outside packing rings, said working cylinder having a cooling jacket surrounding the working chamber and an air space below the cooking jacket surrounding the fixed cylinder, said fixed cylinder being in open communication at its lower end with the crank case, means for admitting air into said piston, said working cylinder having a by-pass and an exhaust port controlled by said piston, said fixed cylinder having openings in communication with said air space, a wrist pin passing through said openings and into said piston, a crank shaft and a connecting rod between said crank shaft and said wrist pin, means to fire the charge in the working chamber, and means to inject a fuel charge into the piston at intervals.

8. In a two cycle internal combustion engine, a crank case, a working cylinder having a base flange secured to said case and being provided with an annular recess, a fixed cylinder located within and spaced from the walls of said working cylinder and having a flange fitted into said recess and secured to said working cylinder thereby to retain said cylinders in rigid fixed co-axial position, a reciprocating piston into which said fixed cylinder fits and which itself fits within the working portion of said working cylinder, said piston having outside packing rings, said fixed cylinder having outside packing rings, said working cylinder having a cooling jacket surrounding the working chamber and an air space below the cooling jacket surrounding the outside cylinder, said fixed cylinder being in open communication at its lower end with the crank case, means for admitting air into said piston, said working cylinder having a by-pass and an exhaust port controlled by said piston, said fixed cylinder having openings in communication with said air space, a wrist pin passing through said openings and into said piston, a crank shaft and a connecting rod between said crank shaft and said wrist pin, means to fire the charge in the working chamber, said by-pass having its outlet and directed upwardly at an acute angle toward the head of the working cylinder, and means to inject a fuel charge into the piston at intervals.

9. In a two cycle internal combustion engine, a crank case, a cylinder, the cylinder having a base flange secured to said case and being provided with an annular recess, a fixed cylinder located within and spaced from the walls of said working cylinder and having a flange fitted into said recess and secured to said working cylinder thereby to retain said cylinders in rigid fixed coaxial position, a reciprocating piston into which said fixed cylinder fits and which itself fits within the working portion of said working cylinder, said piston having outside packing rings, said fixed cylinder having outside packing rings, said working cylinder having a cooling jacket surrounding the working jacket and an air space below the cooling jacket surrounding the fixed cylinder, said fixed cylinder being in open communication at its lower end with the crank case, means for admitting air into said piston, said working cylinder having a by-pass and an exhaust port controlled by said piston, said fixed cylinder having openings in communication with said air space, a wrist pin passing through said openings and into said piston, a crank shaft and a connecting rod between said crank shaft and said wrist pin, means to inject the charge into the piston against the under side of its head thereby to be vaporized and mix with the fresh air within the piston substantially as shown and for the purposes specified.

10. In a two cycle internal combustion engine having a cylinder, a piston, a crank shaft and a connecting rod with piston controlled by-pass and exhaust port; a stationary cylinder over which the piston operates and encloses a piston chamber, said stationary cylinder having ports in its head closed by a back-check-disk-valve, said piston having an outlet port adapted to register with the by-pass port at intervals, said cylinder having a fuel admission port with which said outlet port is adapted to register at times, fuel injecting mechanism, means to operate said mechanism at proper intervals, and means to ignite the mixture in the working chamber at proper times.

11. The method of operating internal combustion engines which have a cylinder and a hollow piston, said method consisting in drawing a charge of air into the hollow piston during the upstroke of the piston, injecting a charge of fuel into such air within the hollow piston at a place adjacent the piston head upon completion of the up-stroke, compressing the mixture within the piston on the down-stroke, by-passing the compressed mixture into the cylinder as the piston reaches the end of its down-stroke, compressing the by-passed mixture within the cylinder on the upstroke of the piston and then firing the same.

12. The method of operating internal combustion engines which have a cylinder and a hollow piston, said method consisting in drawing a charge of air into the hollow piston throughout its up-stroke, injecting fuel at an upward angle adjacent to and in the direction of the piston head through an aperture in the side wall of the piston on an upstroke of the piston, compressing the mixture within the piston on the down-stroke by-passing the mixture into the cylinder as the piston reaches the end of its down-stroke, compressing the by-passed mixture in the cylinder on the up-stroke of the piston and thereafter firing the same.

13. In an internal combustion engine, an outer fixed cylinder, an inner fixed piston and a hollow reciprocating piston operating within the cylinder around the fixed piston, said fixed piston having means to pass air through it into the hollow piston on the upstroke of the hollow piston, said hollow piston having a head and a port in its side wall adjacent the head, said cylinder having an upwardly inclined port near its top adapted to register with the piston on completion of the up-stroke of the piston, said cylinder having a by-pass port and an exhaust port controlled by the piston, and a fuel injecting valve delivering into said upwardly inclined port to inject a charge of fuel into the hollow piston against the head, a crank shaft and a connecting rod between the crank shaft and the reciprocating piston, all being arranged substantially as shown and described.

LEONARD V. HOSFORD.
DAVID DAVISON.